(12) United States Patent
Lee

(10) Patent No.: US 7,002,783 B2
(45) Date of Patent: Feb. 21, 2006

(54) OVER VOLTAGE AND SURGE VOLTAGE PREVENTING CIRCUIT

(75) Inventor: Ju Young Lee, Pohang-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 180 days.

(21) Appl. No.: 10/178,500

(22) Filed: Jun. 25, 2002

(65) Prior Publication Data

US 2003/0067727 A1    Apr. 10, 2003

(30) Foreign Application Priority Data

Oct. 10, 2001    (KR) .............................. P2001-62427

(51) Int. Cl.
*H02H 3/27* (2006.01)
(52) U.S. Cl. .................................... 361/91.3
(58) Field of Classification Search ............... 361/91.3, 361/58; 307/141; 710/302
See application file for complete search history.

(56) References Cited

U.S. PATENT DOCUMENTS

| | | | | |
|---|---|---|---|---|
| 4,990,799 A | * | 2/1991 | Weiss | 327/65 |
| 5,144,222 A | * | 9/1992 | Herbert | 323/271 |
| 5,376,831 A | * | 12/1994 | Chen | 327/379 |
| 5,572,395 A | * | 11/1996 | Rasums et al. | 361/58 |
| 5,587,685 A | * | 12/1996 | Johansson | 327/546 |
| 5,754,797 A | * | 5/1998 | Takahashi | 710/302 |
| 5,758,102 A | * | 5/1998 | Carey et al. | 710/302 |
| 6,301,133 B1 | * | 10/2001 | Cuadra et al. | 363/65 |

OTHER PUBLICATIONS

J. Webster (editor), Wiley Encyclopedia of Electrical and Electronics Engineering, 1999, John Wiley & Sons, Inc., v. 3, pp. 580-585.*
M. Mano, Digital Design, 1984, Prentice-Hall, Inc., pp. 65-66.*

* cited by examiner

*Primary Examiner*—Brian Sircus
*Assistant Examiner*—Z Kitov
(74) *Attorney, Agent, or Firm*—McKenna Long & Aldridge LLP

(57) ABSTRACT

An over voltage and surge voltage preventing circuit for a display module includes resistors that divide an input voltage. A first switching device is turned on when a voltage-divided value made by the resistors is larger than a reference voltage. A second switching device is connected to an output terminal of the first switching device to carry out a switching operation contrary to the first switching device. A third switching device has a control terminal connected to an output terminal of the second switching device to carry out the same switching operation as the second switching device, thereby shutting off said over voltage to output only a normal input voltage. A time constant circuit delays an input voltage supplied from a turn-on time of the power supply by a predetermined time constant to prevent a generation of surge voltage.

20 Claims, 3 Drawing Sheets

OVER VOLTAGE AND SURGE VOLTAGE PREVENTING CIRCUIT

This application claims the benefit of Korean Patent Application No. P2001-62427, filed on Oct. 10, 2001, which is hereby incorporated by reference for all purposes as if fully set forth herein.

BACKGROUND OF THE INVENTION

1. Field of the Invention

This invention relates to an over voltage and surge voltage preventing circuit for a display module.

2. Description of the Related Art

Generally, liquid crystal display (LCD) modules display pictures by controlling light transmittance of a liquid crystal with an electric field. To this end, LCD modules include a liquid crystal display panel containing liquid crystal cells arranged in a matrix pattern and driving circuits for driving the liquid crystal display panel.

In the liquid crystal display panel, gate lines and data lines cross each other. The liquid crystal cell is positioned at each area where the gate lines cross the data lines. An electric field is applied to each of the liquid crystal cells in the liquid crystal display panel using a plurality of pixel electrodes and a common electrode. Each pixel electrode is connected to any one of data lines, via source and drain electrodes of a thin film transistor as a switching device. Light transmittance within the LCD modules is controlled via an electric field applied between a pixel electrode and common electrode in accordance with a data voltage signal specific to each liquid crystal cell, thereby displaying a picture. However, when power is turned on, a surge voltage and an over voltage with an impulse shape are instantaneously generated and may damage driving circuits in the LCD module.

Referring to FIG. 1, an over voltage and surge voltage preventing device 4 for preventing surge voltages and over voltages is provided between a liquid crystal display module (LCM) 10 and a power supply 2.

In FIG. 1, the power supply 2 converts an externally applied alternating current (AC) voltage into direct current (DC) voltage capable of driving the LCM 10. The over voltage and surge voltage preventing device comprises a fuse 6 connected in series to a varistor 8 so as to prevent the application of any over voltage and surge voltage from the power supply 2 to the LCM 10. Conventionally, the fuse 6 is broken by heat generation when current exceeding a threshold value is applied from the power supply 2 thereby preventing an over current. The varistor 8 varies its resistance value non-linearly in accordance with a voltage variation applied from the power supply 2 to provide a constant voltage to the LCM 10.

However, in the over voltage preventing portion 8 of the conventional LCD module, the fuse effectively prevents over currents instead of over voltages, and the varistor is deleteriously sensitive to temperature increases such that varistors typically fail to completely prevent over voltages and surge voltages. Accordingly, when power is turned on in conventional LCD modules, over voltages and surge voltages from the power supply 2 are not reduced sufficiently and thus cause damage to driving circuits within the LCD module.

SUMMARY OF THE INVENTION

Accordingly, the present invention is directed to provide an over voltage and surge voltage preventing circuit for the LCD module that is capable of effectively preventing an over voltage and a surge voltage from a power supply that substantially obviates one or more of the problems due to limitations and disadvantages of the related art.

To achieve these and other advantages and in accordance with the purpose of the present invention, as embodied and broadly described, an over voltage and surge voltage preventing apparatus according to an embodiment of the present invention includes a plurality of resistors for dividing an input voltage; a first switching device turned on when a divided voltage value made by the plurality of resistors is larger than a normal voltage; a second switching device connected to an output terminal of the first switching device to carry out a switching operation opposite the first switching device; a third switching device having a control terminal connected to an output terminal of the second switching device to carry out an identical switching operation as the second switching device, thereby shutting off the over voltage and outputting only a normal input voltage; and a time constant circuit for delaying an input voltage supplied from a turn-on time of the power supply by a predetermined time constant to prevent a generation of surge voltage.

According to the principles of the present invention, when the over voltage is inputted, the first switching device is turned on while the second and third switching devices are turned off to effectively diffuse the applied over voltage.

When the normal voltage is inputted, the first switching device is turned off while the second and third switching devices are turned on to effectively output the normal voltage via the third switching device.

The time constant circuit may be connected to a control terminal of the second switching device.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included herewith to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENTS OF THE INVENTION

Reference will now be made in detail to embodiments of the present invention, examples of which are illustrated in the accompanying drawings.

Figure 1:
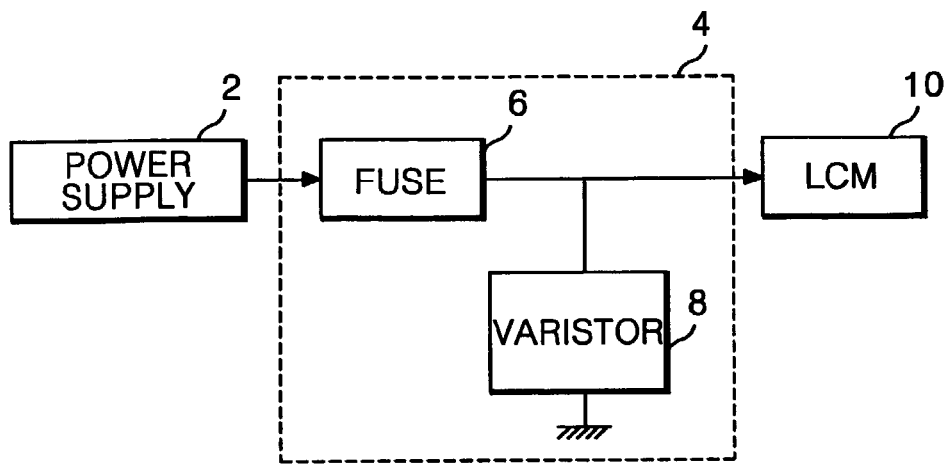
FIG. 1 is a block diagram showing a configuration of a liquid crystal display module with a conventional over voltage and surge voltage preventing circuit.
Figure 2:
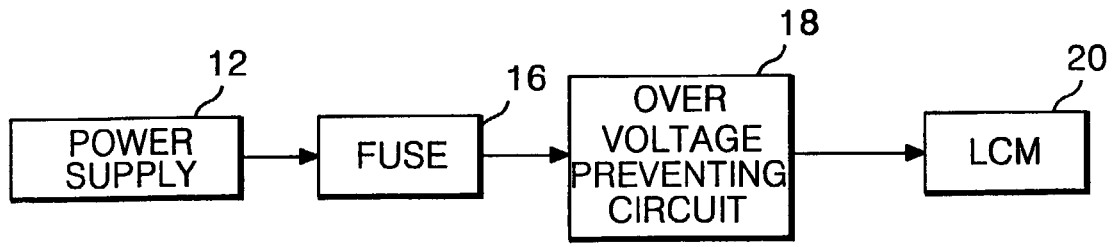
FIG. 2 is a block diagram showing a configuration of a liquid crystal display module with an over voltage and surge voltage preventing circuit according to an embodiment of the present invention.

FIG. 2 is a schematic block diagram illustrating a configuration of a liquid crystal display module with an over voltage and surge voltage preventing circuit according to an embodiment of the present invention.

In FIG. 2, the liquid crystal display includes a fuse 16 and an over voltage and surge voltage preventing circuit 18 connected, in series, between a power supply 12 and a liquid crystal display module (LCM) 20. The fuse 16 may be broken by heat generation when current exceeding a normal value is applied from the power supply 12, thereby preventing an over current from being applied to the liquid crystal display module. The over voltage and surge voltage preventing circuit 18 prevents over voltages and surge voltages from the power supply 12 to be supplied to the LCM 20, thereby supplying a constant voltage to the LCM 20.

Figure 3:
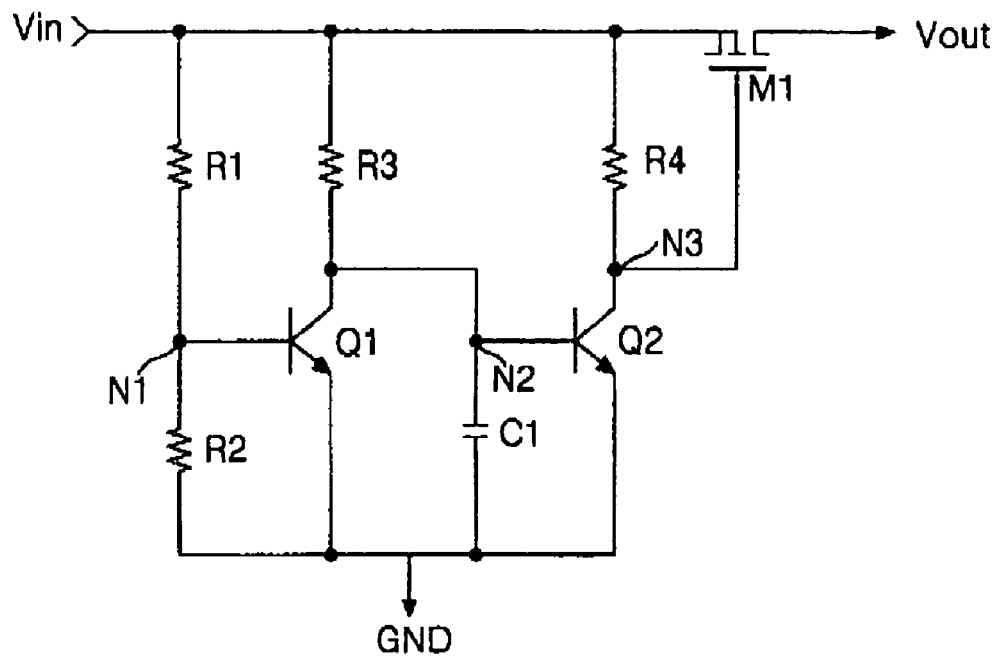
FIG. 3 is a detailed circuit diagram of the over voltage and surge voltage preventing circuit shown in FIG. 2.

In FIG. 3, the over voltage and surge voltage preventing circuit 18 includes a first transistor Q1 that switches in accordance with a divided voltage value of an input voltage Vin, a second transistor Q2 that switches in accordance with the first transistor Q1, and a field effect transistor (FET) M1 that switches in accordance with the second transistor Q2 and supply an output voltage Vout.

The first transistor Q1 includes a base terminal connected to a first node N1 that is connected at a divided voltage point between the first and second resistors R1 and R2, a collector terminal connected to an input line of the input voltage Vin, via a third resistor R3, and an emitter terminal connected to a ground terminal GND. The second transistor Q2 includes a base terminal connected to the collector terminal of the first transistor Q1, a collector terminal connected to the input line of the input voltage Vin, via a fourth resistor R4, and an emitter terminal connected to the ground terminal GND. The FET M1 includes a gate terminal connected to a third node N3 that is also connected to the collector terminal of the second transistor Q2, a source terminal connected to the input line of the input voltage Vin, and a drain terminal connected to the output line of the output voltage Vout. Further, a capacitor C1, which configures a time constant circuit along with the third resistor R3, may be provided between the second node N2 and the ground terminal GND.

Referring to FIGS. 2 and 3, the input voltage Vin passed by the fuse 16 from the power supply 12 is divided according to a resistance ratio between the first and second resistors R1 and R2 and is applied to the base terminal of the first transistor Q1. The resistance value of the second resistor R2 is much smaller than the resistance value of the first resistor R1. Accordingly, the first transistor Q1 maybe turned on only when the input voltage Vin is larger than the normal voltage (e.g., 3.3V or 5V). If an over voltage, larger than the normal voltage, is inputted as the input voltage Vin, then a voltage larger than the threshold voltage (e.g., 0.7V) of the first transistor Q1 is applied and the first transistor Q1 is turned on. Since the saturation voltage (e.g., 0.2V) from the turned-on first transistor Q1 is applied to the second node N2, the second transistor Q2 is turned off. Since a voltage applied to the third node N3 is shut off by the turned-off second transistor Q2, the FET M1 is effectively turned off and any over voltage is effectively reduced.

If the normal voltage (e.g., 3.3V or 5V) is applied as the input voltage Vin, then a voltage smaller than the threshold voltage (e.g., 0.7V) of the first transistor Q1 is applied to the first node N1 and the first transistor Q1 is turned off. Thus, the input voltage Vin reaches the base terminal of the second transistor Q2 and the second transistor Q2 is turned on. As a result, a voltage larger than a threshold voltage (e.g., 1.8V) is applied to turn on the gate terminal of the FET M1 so that the input voltage Vin may be provided as the output voltage Vout. The input voltage Vin applied to the second transistor Q2 is delayed by an RC time constant due to the presence of a time constant circuit including third resistor R3 and capacitor C1. Accordingly, the second transistor Q2 driving the FET M1 may be turned on while being delayed by an RC time constant. Accordingly, the output voltage Vout may be outputted as being delayed as shown in FIG. 4.

Figure 4:
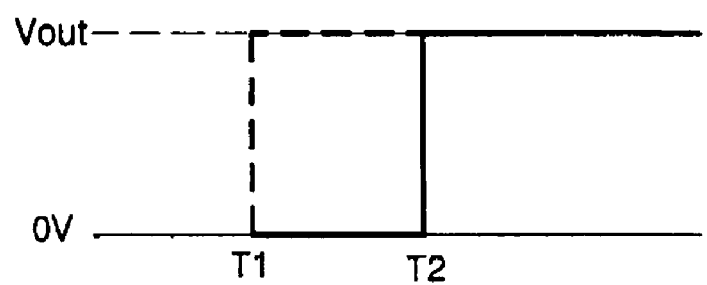
FIG. 4 is a waveform diagram of an output voltage applied upon power turn-on of the over voltage and surge voltage preventing circuit shown in FIG. 3.

As shown in FIG. 4, the conventional output voltage Vout was supplied just at a power turn-on time T1, whereas the output voltage Vout of the present invention is supplied at an application time T2, delayed by an RC time constant from said turn-on time T1. As mentioned above, the present invention delays an application time T2 of the output voltage Vout, so that surge voltages frequently occurring near the power turn-on time T1 can be reduced. Since most surge voltages are generated near the power turn-on time T1, the present invention makes it possible to prevent the surge voltage from being applied to the LCM 20 by delaying the output voltage Vout to an application time T2.

Figure 5:
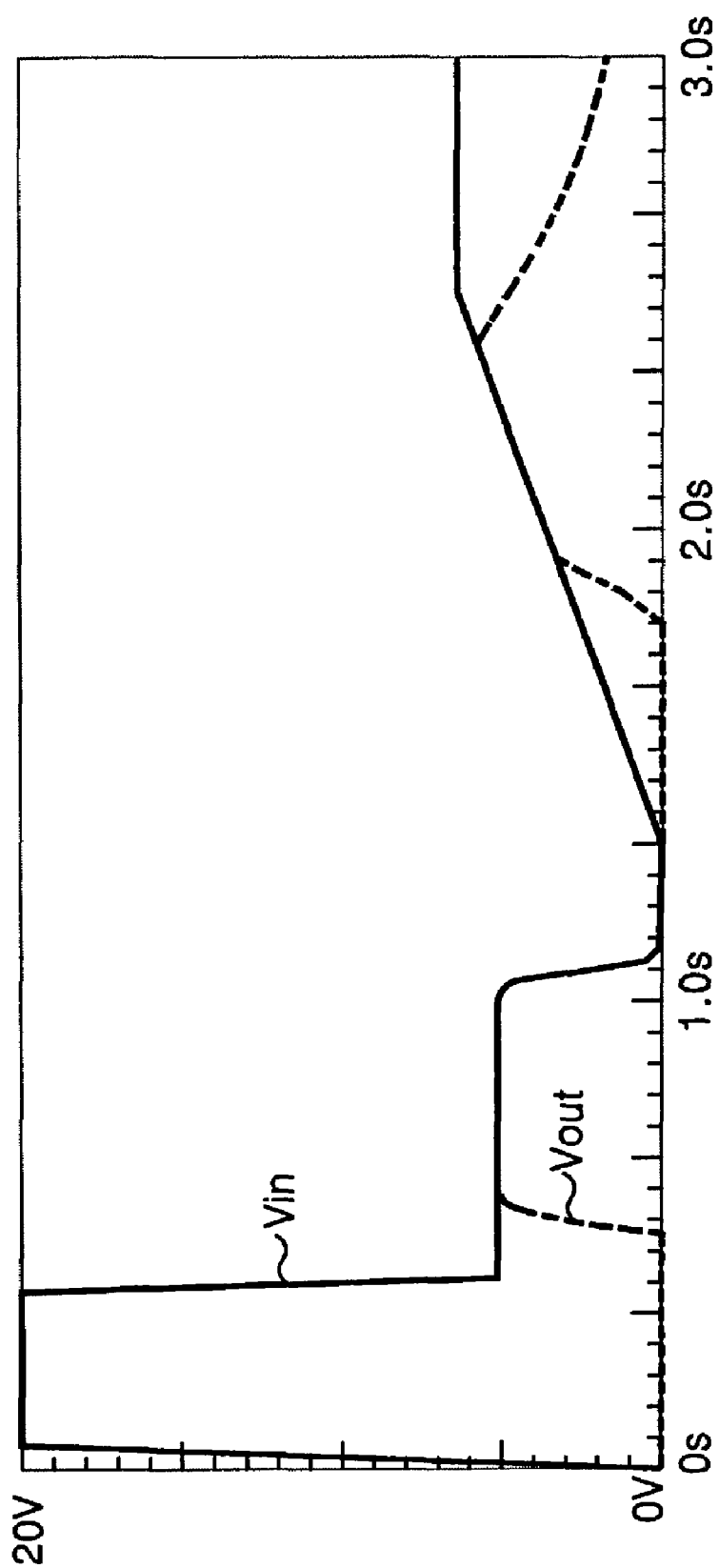
FIG. 5 is an input and output waveform diagram of the over voltage and surge voltage preventing circuit shown in FIG. 3.

FIG. 5 illustrates a waveform diagram simulating an output voltage Vout of the over/surge voltage preventing circuit with respect to a virtual over voltage Vin.

As shown in FIG. 5, when a virtual over voltage is supplied as the input voltage Vin at 0 seconds, the output voltage Vout of the over voltage and surge voltage preventing circuit shown in FIG. 3 is delayed by an interval determined by an RC time constant. Thus, an over voltage and a surge voltage occurring during the RC time constant interval is reduced. For example, if the normal voltage is 5V, then the output voltage Vout follows the input voltage Vin at the normal voltage. If the input voltage Vin is provided as an over voltage larger than the normal voltage, e.g., over 5V, then the output voltage Vout is rapidly reduced.

As described above, according to the present invention, over voltages and surge voltages are reduced thereby preventing damage to driving circuits within an LCD module. Particularly, the output voltage of the over voltage and surge voltage preventing circuit is delayed by a predetermined time from the power turn-on time. It is therefore possible to effectively reduce a surge voltage occurring near the power turn-on time.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An over voltage and surge voltage preventing device for reducing an over voltage and a surge voltage from a power supply, said apparatus comprising:
   a plurality of resistors for dividing an input voltage;
   a first switching device, wherein the first switching device is turned on when a value of the divided voltage is larger than a normal voltage;
   a second switching device connected to an input terminal of the first switching device, wherein the second switching device performs a switching operation opposite the first switching device;

a control terminal of a third switching device connected to an input terminal of the second switching device, wherein the third switching device performs the same switching operation as the second switching device, thereby reducing an over voltage and outputting only the normal voltage; and a time constant circuit connected to a control terminal of the second switching device for delaying an input voltage supplied by the power supply by a predetermined time constant to prevent a generation of surge voltage.

2. The over voltage and surge voltage preventing device according to claim 1, wherein the first switching device is turned on while the second and third switching devices are turned off, when the over voltage is inputted, thereby reducing the over voltage.

3. The over voltage and surge voltage preventing device according to claim 1, wherein the first switching device is turned off while the second and third switching devices are turned on, when said normal voltage is inputted, thereby outputting said normal voltage via the third switching device.

4. The over voltage and surge voltage preventing device according to claim 1, wherein the time constant circuit is connected to a control terminal of the second switching device.

5. An over voltage and surge voltage preventing circuit comprising:
   an input voltage source;
   first and second resistors connected in series to the input voltage source;
   a first switching device including a first control terminal between the first and second resistors and a first input terminal connected to the input voltage source via a third resistor;
   a second switching device including a second control terminal connected to the first input terminal and a second input terminal connected to the input voltage source via a fourth resistor;
   a third switching device including a third control terminal connected to the second input terminal, a third input terminal connected to the input voltage source, and a third output terminal connected to an output voltage line; and
   a time constant circuit including the third resistor, the time constant circuit connected to the second control terminal of the second switching device.

6. The over voltage and surge voltage preventing circuit according to claim 5, wherein the first control terminal includes a base terminal.

7. The over voltage and surge voltage preventing circuit according to claim 5, wherein the second control terminal includes a base terminal.

8. The over voltage and surge voltage preventing circuit according to claim 5, wherein the third control terminal includes a gate terminal.

9. The over voltage and surge voltage preventing circuit according to claim 5, wherein the first input terminal includes a collector terminal.

10. The over voltage and surge voltage preventing circuit according to claim 5, wherein the second input terminal includes a collector terminal.

11. The over voltage and surge voltage preventing circuit according to claim 5, wherein the third input terminal includes a source terminal.

12. The over voltage and surge voltage preventing circuit according to claim 5, wherein a resistance value of the second resistor is less than a resistance value of the first resistor.

13. The over voltage and surge voltage preventing circuit according to claim 5, wherein the first switching device performs a first switching operation and the second and third switching devices perform a second switching operation, opposite the first switching operation.

14. The over voltage and surge voltage preventing circuit according to claim 13, wherein an input voltage from the input voltage source is an over voltage, larger than a normal voltage, and the first switching operation is an operation that turns the first switching device on.

15. The over voltage and surge voltage preventing circuit according to claim 13, wherein an input voltage from the input voltage source is a normal voltage, and the first switching operation is an operation that turns the first switching device off.

16. The over voltage and surge voltage preventing circuit according to claim 5, wherein an input voltage from the input voltage source applied to the second switching device is delayed by predetermined time constant due to the presence of the time constant circuit.

17. A method of protecting an electronic device from an over voltage and surge voltage applied from a power source, comprising:
   providing, in series, first and second resistors connected to an input voltage source;
   connecting a first control terminal of a first switching device between the first and second resistors and a first input terminal of the first switching circuit to the input voltage source via a third resistor;
   connecting a second control terminal of a second switching device to the first input terminal and a second input terminal of the second switching device to the input voltage source via a fourth resistor;
   connecting third control terminal of a third switching device to the second input terminal, a third input terminal of the third switching device to the input voltage source, and a third output terminal of the third switching device to an output voltage line; and
   providing a time constant circuit, wherein the time constant circuit includes the third resistor and is connected to the second control terminal of the second switching device.

18. The method of protecting an electronic device from an over voltage and surge voltage according to claim 17, wherein a resistance value of the second resistor is less than a resistance value of the first resistor.

19. The method of protecting an electronic device from an over voltage and surge voltage according to claim 17, wherein the first switching device performs a first switching operation and the second and third switching devices perform a second switching operation, opposite the first switching operation.

20. The method of protecting an electronic device from an over voltage and surge voltage according to claim 17, further comprising delaying an input voltage applied to the second switching device.

* * * * *